United States Patent Office.

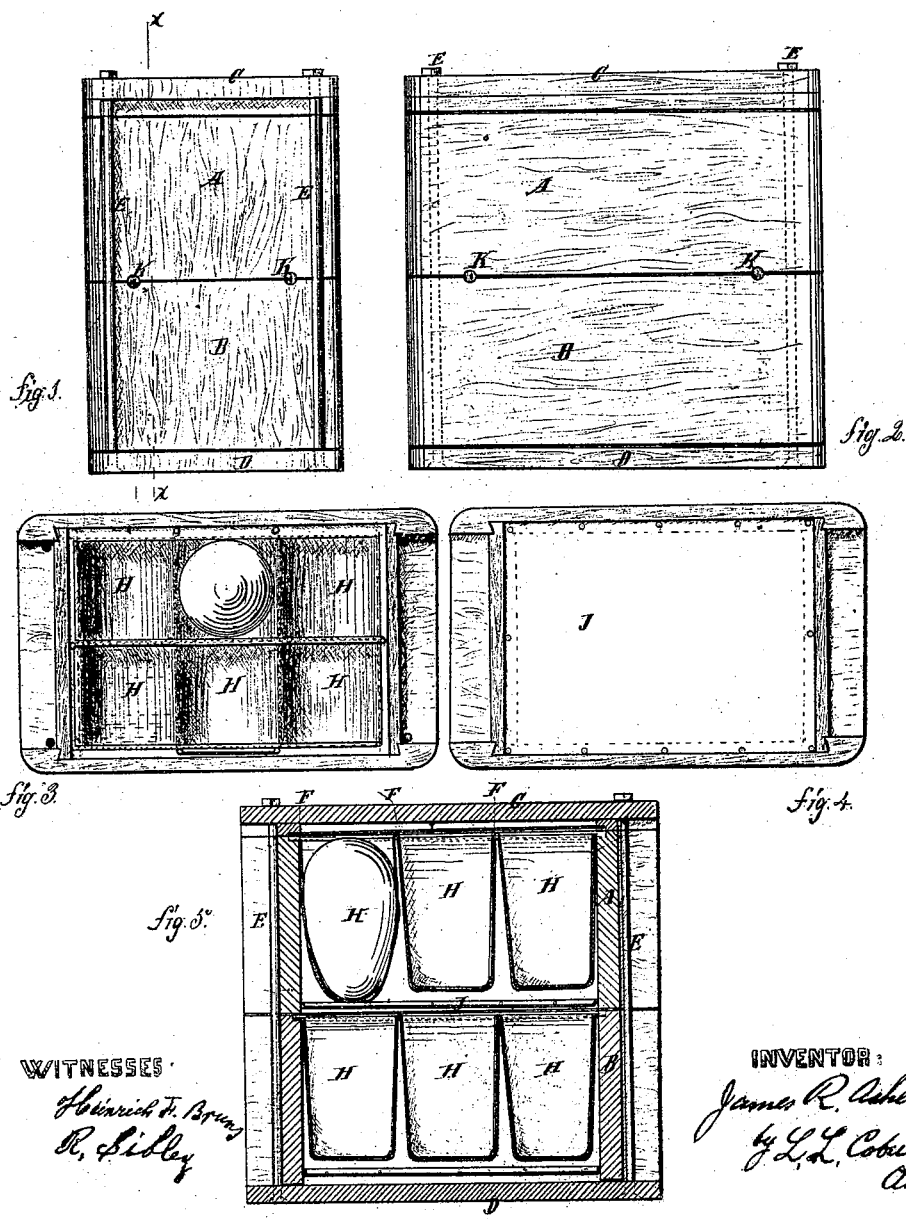

JAMES R. ASHER, OF OSKALOOSA, IOWA, ASSIGNOR TO HIMSELF AND ROBERT I. ROBESON, OF SAME PLACE.

Letters Patent No. 106,983, dated September 6, 1870.

IMPROVEMENT IN EGG-CARRIERS.

The Schedule referred to in these Letters Patent and making part of the same.

I, JAMES R. ASHER, of Oskaloosa, in the county of Mahaska and State of Iowa, have invented a new and useful Improvement in "Boxes for Packing Eggs," of which the following is a specification, reference being had to the accompanying drawing which forms a part thereof.

Object and Nature of my Invention.

The object of my invention consists in making a box in which eggs can be packed and transported without danger of breakage; and My invention relates to the canvas pockets, hung suspended so as to keep the eggs separated from each other, and apart from any hard substance, and to making the box in sections, and providing the bottom of each section with a canvas to keep the eggs from being thrown from the pockets.

Description of the Drawing.

Figure 1 represents an end view of my egg-box;
Figure 2, a side view;
Figure 3, a plan view of the box with the top removed;
Figure 4, a bottom view of the top section or drawer of the box; and
Figure 5 is a vertical sectional view, taken at the line x x.

General Description.

A and B represent the sections of my egg-box, held between the top C and bottom D of the box, by the rods E.

F are wires or cords, stretched across the box near the top of each section, to support the canvas pockets H. These pockets are made by laying strips of canvas or paper across each other, and causing them to hang or sag down between the wires, and form the pockets. The way they are hung over the wires is clearly shown in fig. 5. The strips cross each other, forming the pockets, and extend from side to side of the box. I prefer making the pockets so that the egg is entirely inclosed.

I is an egg, placed within one of the pockets.

The wires F are represented by dotted lines in fig. 3.

J represents a canvas, stretched across the box in such a position that it will be above a set of pockets when the box is put together. The object of the canvas diaphragm is to make a sort of cover for each set of pockets, to prevent the eggs from being thrown out of them, and also to present such a surface as will not break the eggs if they are thrown against it.

The pockets H do not extend down to the canvas J.

I pack the eggs on end, each egg in a pocket by itself; they, therefore, will keep a long time, and can be transported without danger of breakage.

K are air-holes for ventilating the box, when desired.

The pockets H may be made of canvas or paper, or other soft material, suitable for the purpose; also, the sections of the box can be made more in the form of drawers, that can be firmly fastened within the box.

What I claim, and desire to secure by Letters Patent, is—

The box for packing eggs, when composed of separate sections A B, secured between a top and bottom piece by the rods E, and provided with pockets H and canvas J, constructed and arranged substantially as specified and shown.

JAS. R. ASHER.

Witnesses:
HENRY P. NINDE,
L. W. STIRLING.